(12) United States Patent
Chen (10) Patent No.: US 10,603,852 B2
(45) Date of Patent: Mar. 31, 2020

(54) METHOD FOR MAKING BICYCLE CRANK ARM

(71) Applicant: TWDT PRECISION CO., LTD., Changhua County (TW)

(72) Inventor: Cheng-Ho Chen, Changhua County (TW)

(73) Assignee: TWDT PRECISION CO., LTD, Changhua County (TW)

(*) Notice: Subject to any disclaimer, the term of this patent is extended or adjusted under 35 U.S.C. 154(b) by 77 days.

(21) Appl. No.: 15/691,164

(22) Filed: Aug. 30, 2017

(65) Prior Publication Data

US 2019/0061292 A1 Feb. 28, 2019

(51) Int. Cl.

| | |
|---|---|
| *B29C 70/86* | (2006.01) |
| *B29C 70/16* | (2006.01) |
| *B29C 70/34* | (2006.01) |
| *B29C 53/56* | (2006.01) |
| *B29C 70/24* | (2006.01) |
| *B62M 3/00* | (2006.01) |
| *B29C 53/80* | (2006.01) |
| *B29C 53/82* | (2006.01) |
| *B29L 31/30* | (2006.01) |
| *B29L 31/00* | (2006.01) |
| *B29K 309/08* | (2006.01) |
| *B29K 307/04* | (2006.01) |
| *B29K 105/06* | (2006.01) |

(52) U.S. Cl.
CPC .......... *B29C 70/86* (2013.01); *B29C 53/564* (2013.01); *B29C 53/8075* (2013.01); *B29C 53/822* (2013.01); *B29C 70/16* (2013.01); *B29C 70/24* (2013.01); *B29C 70/347* (2013.01); *B62M 3/00* (2013.01); *B29K 2105/06* (2013.01); *B29K 2307/04* (2013.01); *B29K 2309/08* (2013.01); *B29L 2031/3091* (2013.01); *B29L 2031/7488* (2013.01)

(58) Field of Classification Search
None
See application file for complete search history.

(56) References Cited

U.S. PATENT DOCUMENTS

| | | | |
|---|---|---|---|
| 5,435,869 A * | 7/1995 | Christensen | .......... B29C 53/564 156/169 |
| 5,632,940 A * | 5/1997 | Whatley | ............... B29C 70/342 156/173 |
| 7,090,737 B2 * | 8/2006 | Lindenau | .............. B29C 53/564 156/169 |
| 2008/0272572 A1 | 11/2008 | Tsai | |

FOREIGN PATENT DOCUMENTS

| | | | |
|---|---|---|---|
| EP | 2921291 A | * | 9/2015 |
| TW | 200829472 A | | 7/2008 |

OTHER PUBLICATIONS

Machine Translation of European Patent 2921291, Date Unknown.*
(Continued)

*Primary Examiner* — Jeffry H Aftergut (57) ABSTRACT

A method for making a bicycle crank arm includes (a) providing an inner frame unit, (b) winding a first bundle of unidirectional continuous fibers on the inner frame unit to form an intersecting pattern, (c) impregnating the intersecting pattern with a curable resin material to obtain an impregnated structure, and (d) molding the impregnated structure in a mold.

8 Claims, 9 Drawing Sheets

(56) References Cited

OTHER PUBLICATIONS

Search Report appended to an Office Action issued to Taiwanese counterpart application No. 107129428 by the TIPO dated Jan. 3, 2019, with an English translation thereof.
Search Report issued to European counterpart application No. 18191551.3 by the EPO dated Jan. 15, 2019.

* cited by examiner

METHOD FOR MAKING BICYCLE CRANK ARM

FIELD

The disclosure relates to a method for making a crank arm, more particularly to a method for making a bicycle crank arm of a bicycle.

BACKGROUND

US patent publication no. 2009/0236777 A1 discloses a method for making a crank of a bicycle includes preparing a prepreg material and a bladder, heat-pressing the prepreg material and bladder, cutting the prepreg material and the bladder to form two engaging sections to engage with two connectors, wrapping a carbon-fiber cloth, and heating the prepreg material and first and second connectors that is wrapped by the carbon-fiber cloth.

However, the conventional bicycle crank may have an insufficient strength. To provide a crank with a larger strength, the crank may be made by winding multiple layers of composite material (prepreg) around a core, followed by curing. In this case, the weight of the bicycle crank would be undesirably increased.

US patent publication nos. 2007/0186719 and 2008/0272572, and European patent publication no. 2921291 A1 also disclose bicycle crank arms.

SUMMARY

An object of the disclosure is to provide a novel method for making a bicycle crank arm. By virtue of the novel method, a light-weight and high-strength bicycle crank arm may be obtained.

According to the disclosure, a method for making a bicycle crank arm of a bicycle includes:

(a) providing an inner frame unit which defines a longitudinal axis, and which has
 a first seat,
 a second seat which is spaced apart from the first seat in a direction of the longitudinal axis, the first and second seats defining therebetween an elongated space,
 at least one first direction reversing guide formed in or in proximity to the first seat, and
 at least one second direction reversing guide formed in or in proximity to the second seat;

(b) winding a first bundle of unidirectional continuous fibers over the elongated space through the first and second direction reversing guides to form an intersecting pattern on the inner frame unit;

(c) impregnating the intersecting pattern with a curable resin material to obtain an impregnated structure; and (d) molding the impregnated structure in a mold to cure the curable resin material to thereby obtain a fiber-reinforced semi-product for the bicycle crank arm.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 8:
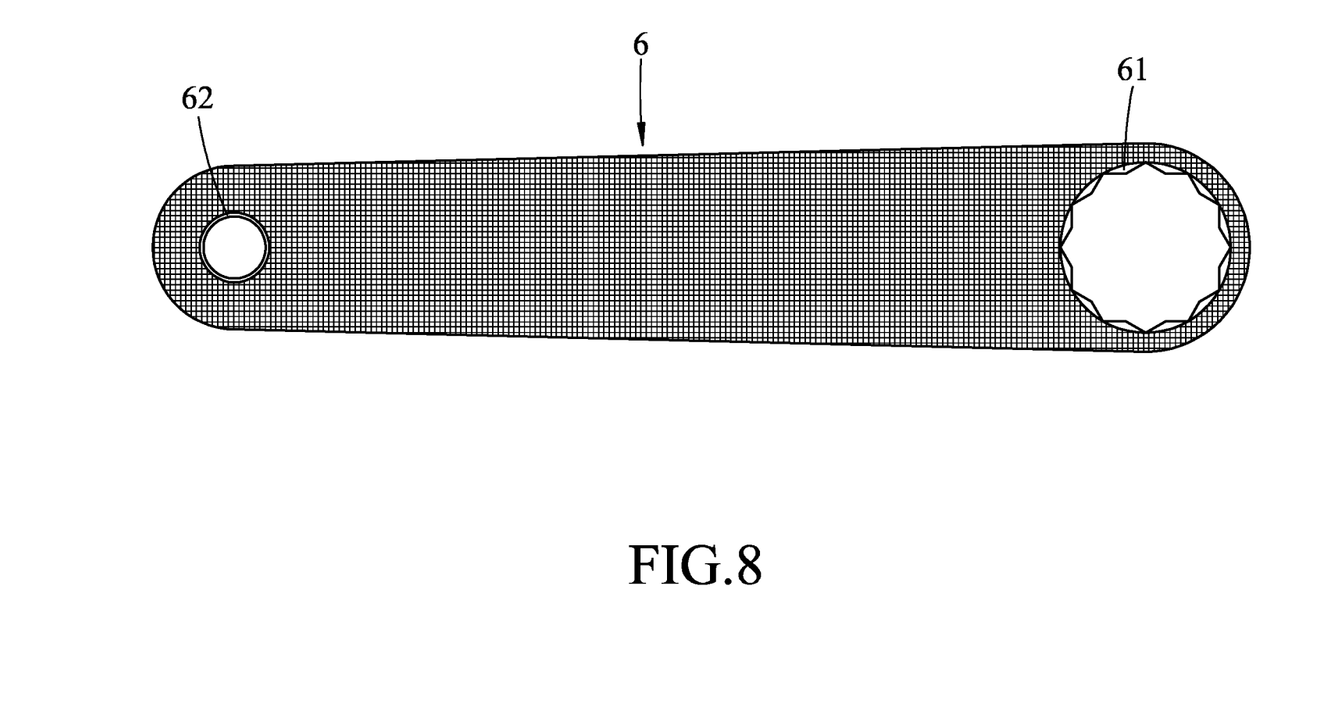
FIG. 8 is a schematic view of the bicycle crank arm according to the embodiment of the disclosure.

A method for making a bicycle crank arm (reference numeral 6 as shown in FIG. 8) according to a first embodiment of the disclosure includes (a) to (d).

Figure 1:
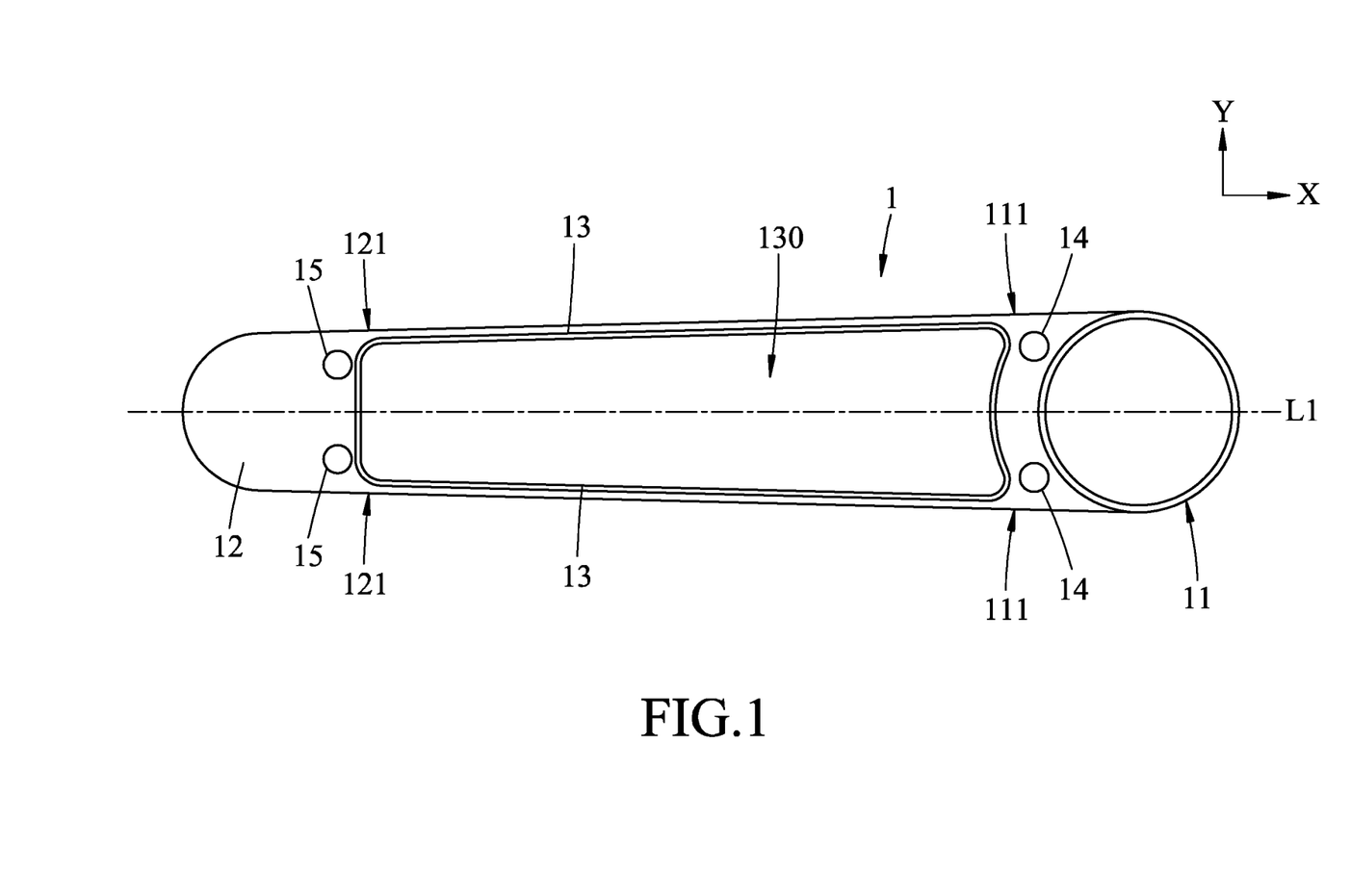
FIG. 1 is a top schematic view of an inner frame unit for making a bicycle crank arm according to a first embodiment of the disclosure.

In (a), an inner frame unit 1 is provided. As shown in FIG. 1, the inner frame unit 1 defines a longitudinal axis (L1) and has a first seat 11, a second seat 12, a pair of bridging ribs 13, at least one first direction reversing guide 14, and at least one second direction reversing guide 15. In this embodiment, the inner frame unit 1 is made of a metal material.

The second seat 12 is spaced apart from the first seat 11 in a direction (X) of the longitudinal axis (L1). The first and second seats 11, 12 define therebetween an elongated space 130.

Each of the bridging ribs 13 interconnects the first and second seats 11, 12 at first and second junctures 111, 121. The bridging ribs 13 are spaced apart from each other in a transverse direction (Y) relative to the longitudinal direction (X) such that the elongated space 130 is further defined by the bridging ribs 13.

The at least one first direction reversing guide 14 is formed in or in proximity to one of the first junctures 111 of the first seat 11. The at least one second direction reversing guide 15 is formed in or in proximity to one of the second junctures 121 of the second seat 12. In this embodiment, the inner frame unit 1 has two of the first direction reversing guides 14 formed respectively in the first junctures 111 of the first seat 11, and two of the second direction reversing guides 15 formed respectively in the second junctures 121 of the second seat 12. As shown in FIG. 1, each of the first and second direction reversing guides 14, 15 is in the form of a guide hole for extension of a first bundle of unidirectional continuous fibers 10, as described below.

Figure 3:
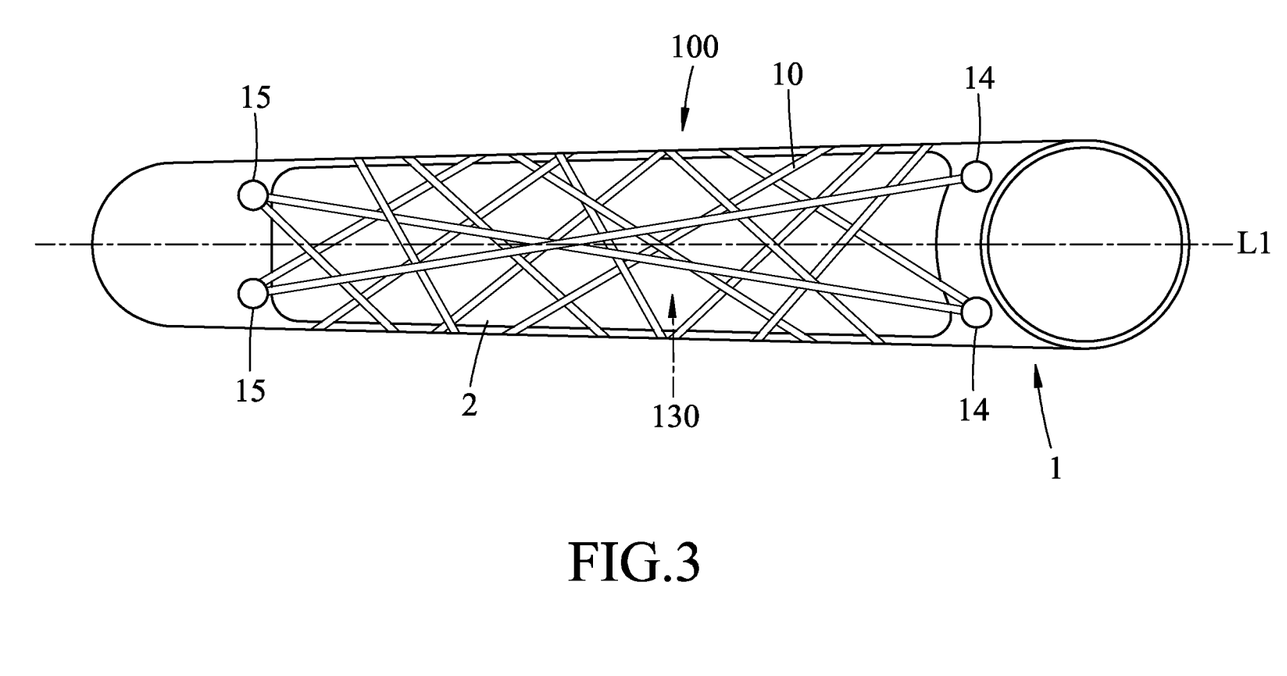
FIG. 3 is a schematic view illustrating an intersecting pattern formed around a longitudinal axis of the inner frame unit.

In (b), as shown in FIG. 3, the first bundle of unidirectional continuous fibers 10 is wound over the elongated space 130 through the first and second direction reversing guides 14, 15 so as to form the intersecting pattern 100 around the longitudinal axis (L1). With the provision of the intersecting pattern 100, strength of the obtained bicycle crank arm 6 may be enhanced.

The unidirectional continuous fibers of the first bundle 10 may be carbon fibers or glass fibers. In this embodiment, the unidirectional continuous fibers of the first bundle 10 are carbon fiber, and a commercially available carbon fiber yarn (Tairyfil carbon fiber TC42-12k, Formosa Plastics Corporation, Taiwan) may be used as the first bundle of unidirectional continuous fibers 10.

Figure 2:
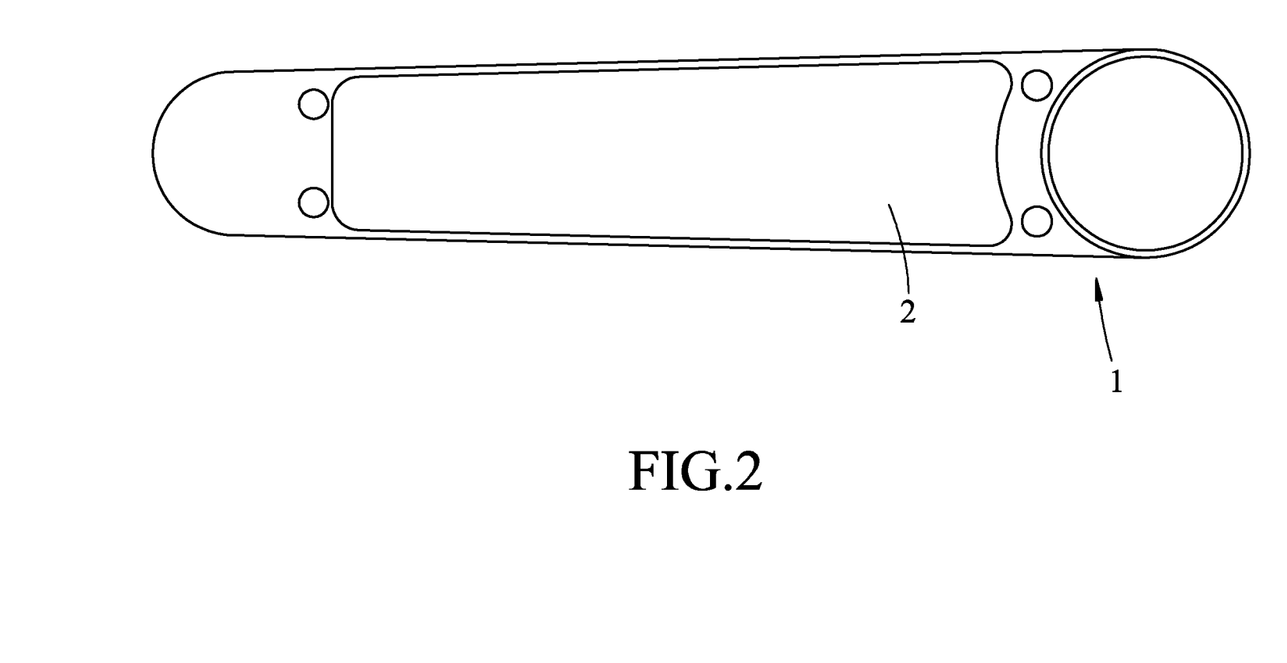
FIG. 2 is similar to FIG. 1 but illustrating a foam member which is fittingly inserted into an elongated space of the inner frame unit.

Furthermore, in this embodiment, before (b), the method may further include (a1). In (a1), a foam member 2 is fittingly inserted into the elongated space 130, as shown in FIG. 2. The foam member 2 may be made from any suitable foam material.

Figure 7:
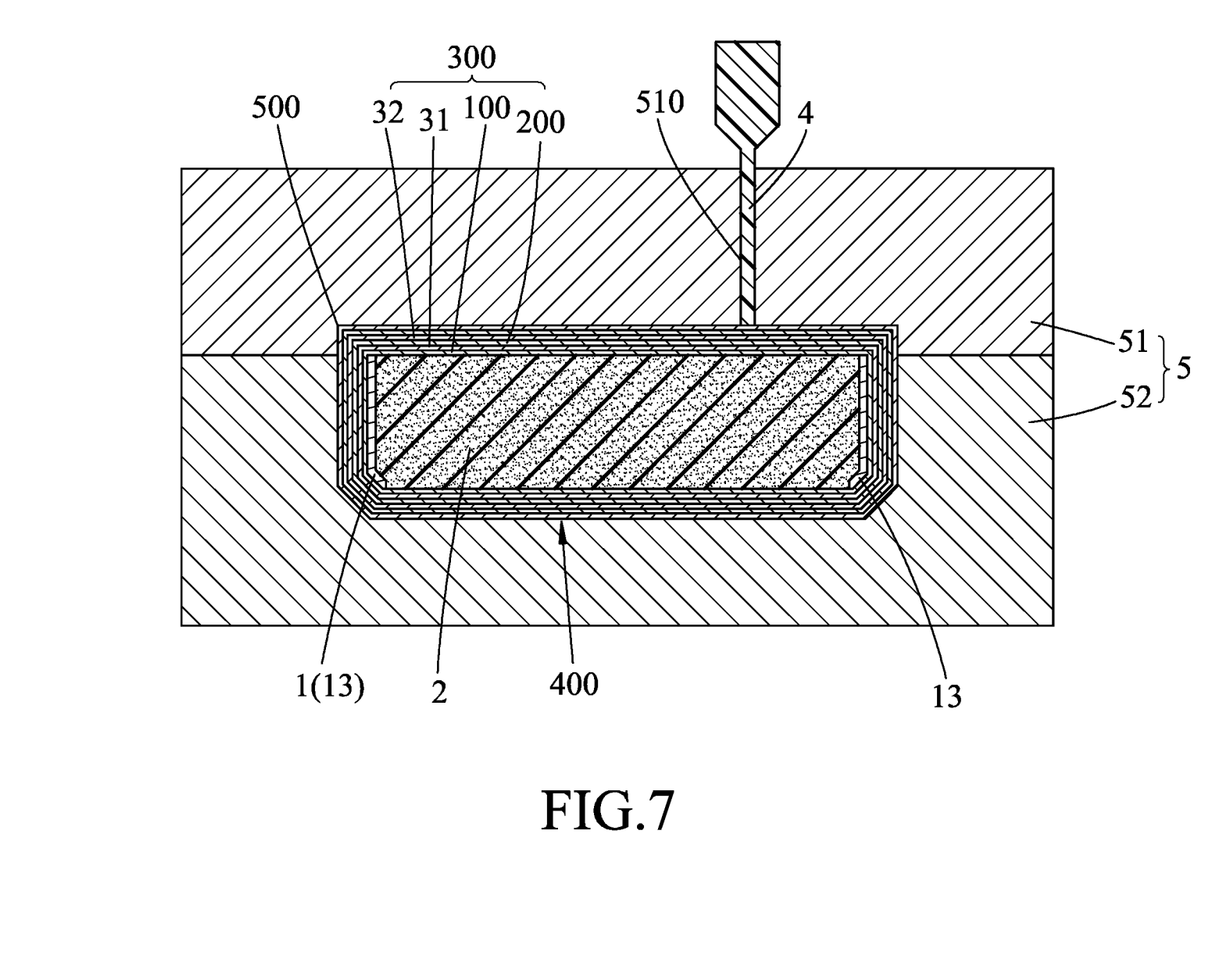
FIG. 7 is a schematic cross-sectional view illustrating an impregnated structure disposed in a mold.

In (c), a fiber laminate 300 including the intersecting pattern 100 is impregnated with a curable resin material 4 to obtain an impregnated structure 400. As shown in FIG. 7, before (c), the fiber laminate 300, together with the inner frame unit 1, is disposed in a mold cavity 500 defined between an upper mold segment 51 and a lower mold segment 52 of a mold 5. In (c), a curable resin material 4 is applied to the mold cavity 500 through an injection duct 510 formed in the upper mold segment 51 so as to permit the fiber laminate 300 to be impregnated with the curable resin material 4, thereby obtaining the impregnated structure 400.

In this embodiment, the fiber laminate 300 further includes a first fiber braided sleeve 31, a helical pattern 200, and a second fiber braided sleeve 32 (see FIGS. 4 to 6), and before (c), the method further includes (b1), (b2), and (b3).

Figure 4:
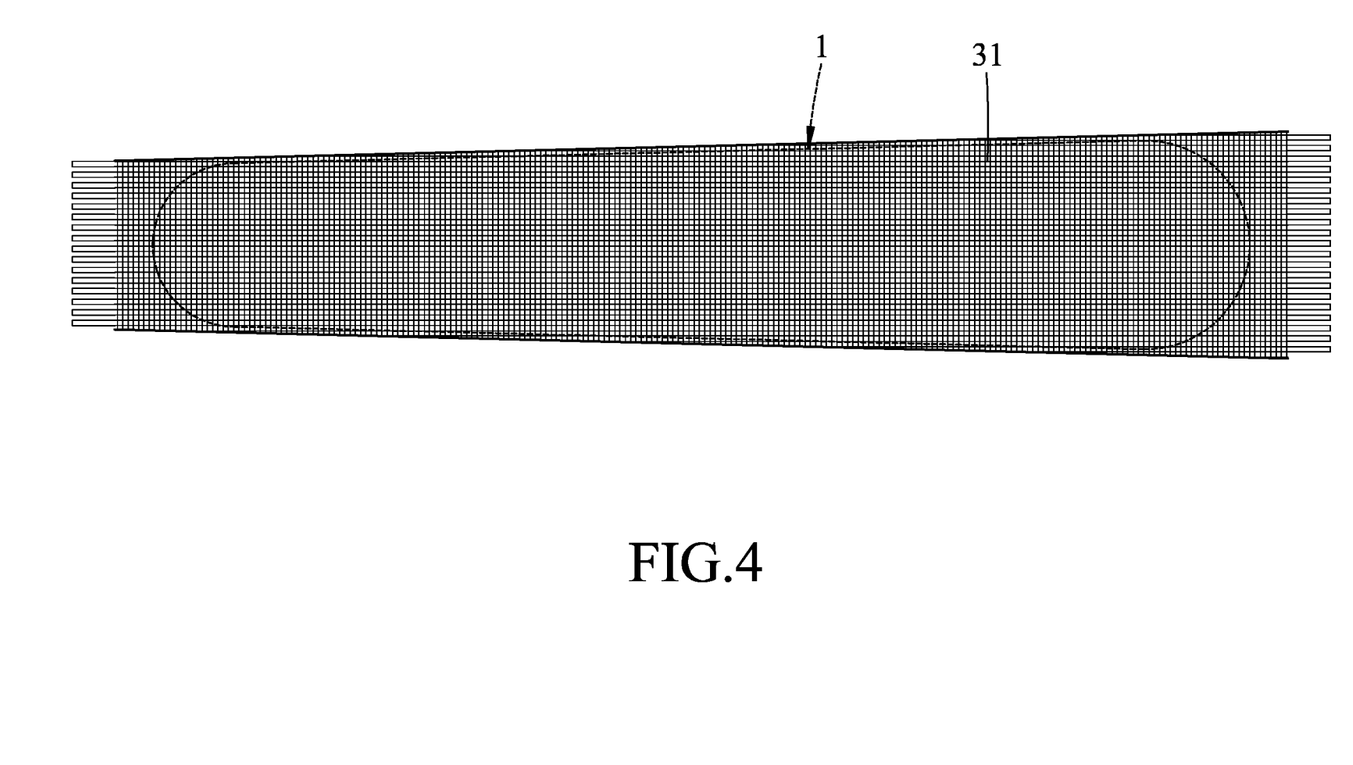
FIG. 4 is a schematic view illustrating a first fiber braided sleeve which covers the inner frame unit.

In (b1), as shown in FIG. 4, the inner frame unit 1 is covered with a first fiber braided sleeve 31 so as to permit the first fiber braided sleeve 31 to overlie the intersecting pattern 100 shown in FIG. 3. The first fiber braided sleeve 31 may be made of carbon fibers or glass fibers. In this embodiment, the first fiber braided sleeve 31 is made of carbon fibers, and a commercially available carbon fiber braided sleeve (3k-T300, Toray, Japan) may be used as the first fiber braided sleeve 31.

In other embodiments, to further enhance the strength of the bicycle crank arm 6, an additional fiber braided sleeve (not shown) may be used to cover the first fiber braided sleeve 31.

Figure 5:
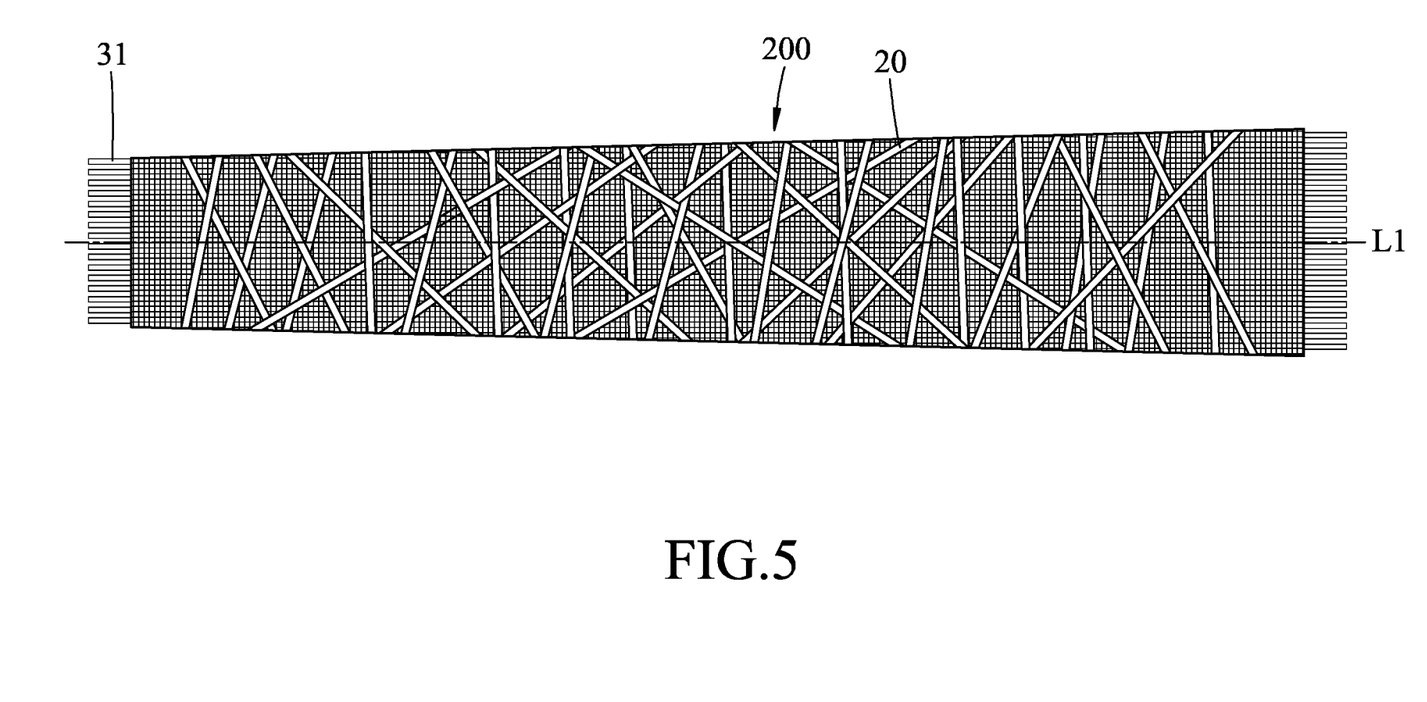
FIG. 5 is a schematic view illustrating a helical pattern formed on the first fiber braided sleeve.

In (b2), as shown in FIG. 5, a second bundle of unidirectional continuous fibers 20 is helically wound on the first fiber braided sleeve 31 about the longitudinal axis (L1) to form the helical pattern 200. The second bundle 20 may be made of the same material of that of the first bundle 10.

Figure 6:
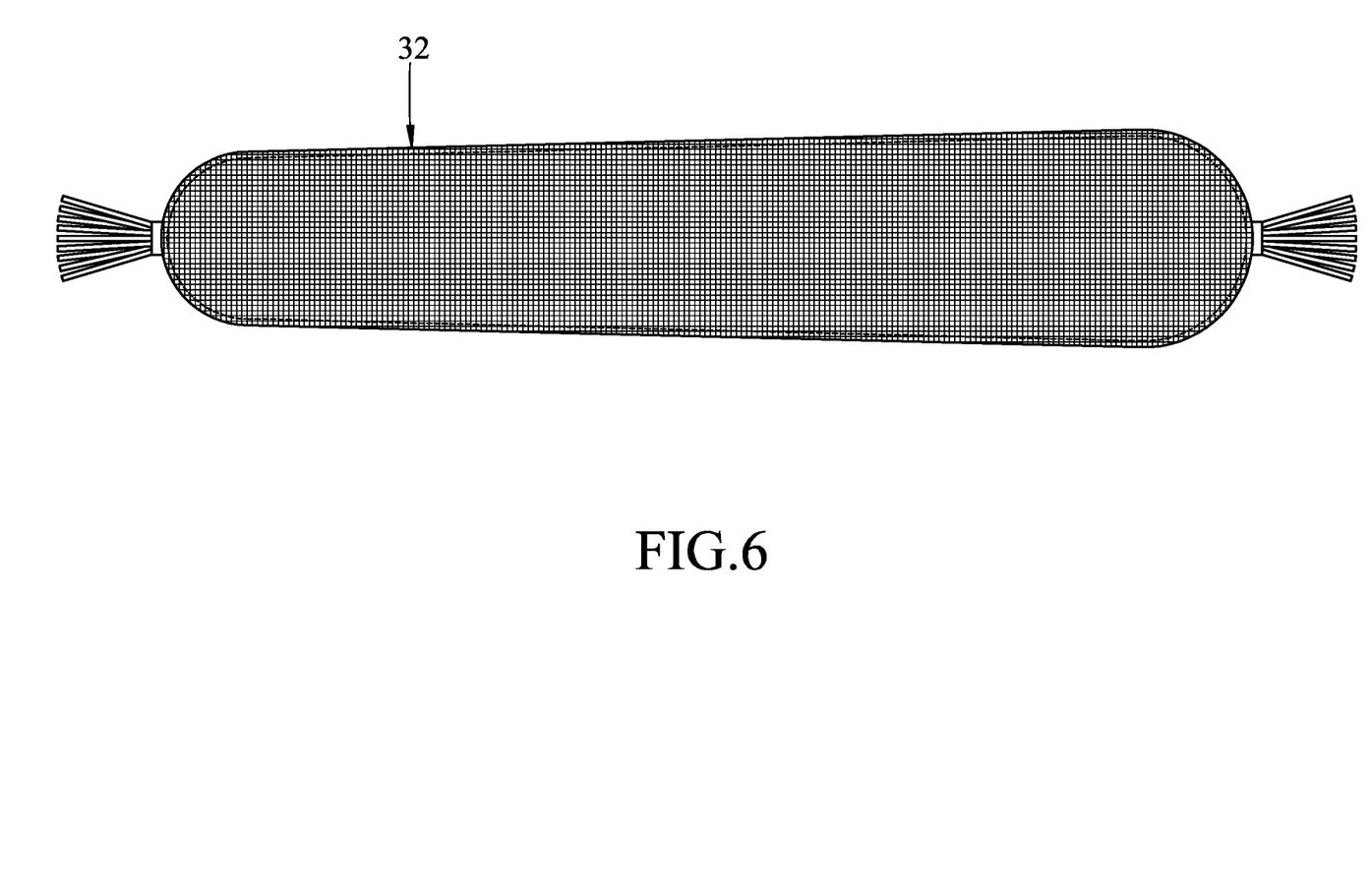
FIG. 6 is a schematic view illustrating a second fiber braided sleeve which covers the helical pattern shown in FIG. 5.

In (b3), as shown in FIG. 6, the helical pattern 200 is overlain with the second fiber braided sleeve 32. Thereafter, before (c), each end of the second fiber braided sleeve 32 is tied into a knot. The second fiber braided sleeve 32 may be made of the same material of that of the first fiber braided sleeve 31.

Accordingly, in (c) of this embodiment, the first fiber braided sleeve 31, the second fiber braided sleeve 32, and the helical pattern 200, together with the intersecting pattern 100, are impregnated with the curable resin material 4.

In (d), the impregnated structure 400 is molded in the mold 5 to cure the curable resin material 4 to thereby obtain a fiber-reinforced semi-product (not shown) for the bicycle crank arm 6.

The fiber-reinforced semi-product may be processed by a well-know method to permit the bicycle crank arm 6 of FIG. 8 to have two coupling inserts 61, 62 which are used for coupling a bottom bracket and a pedal of a bicycle, respectively. Alternatively, the coupling inserts 61, 62 may be co-molded with the impregnated structure 400.

Figure 9:
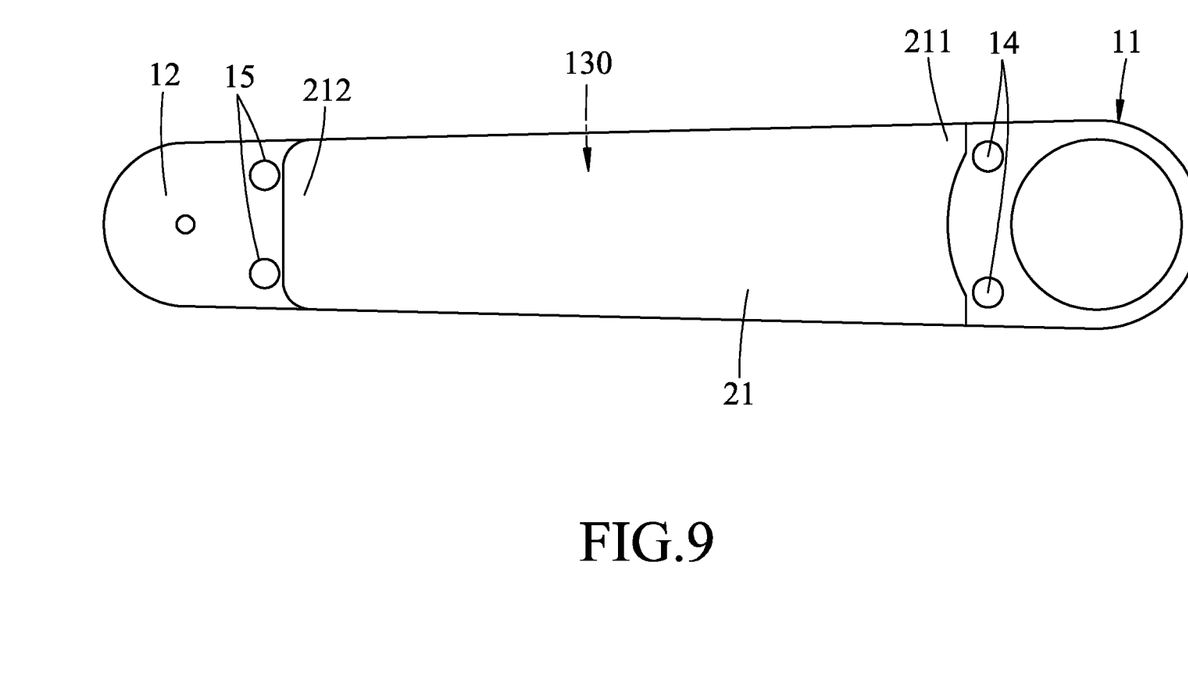
FIG. 9 is a top schematic view of an inner frame unit for making a bicycle crank arm according to a second embodiment of the disclosure, in which an elongated foam member is disposed between first and second seats of the inner frame unit.

FIG. 9 illustrates a top schematic view of an inner frame unit 1 for making a bicycle crank arm according to a second embodiment of the disclosure. The inner frame unit 1 used in the second embodiment is similar to that used in the first embodiment except that, in the second embodiment, the inner frame unit 1 does not include the bridging ribs 13. In addition, in the method for making the bicycle crank arm of the second embodiment is similar to the method of the first embodiment, except that in the second embodiment, (a1) of the first embodiment is replaced by (a2) and (a3).

In (a2), an elongated foam member 21 with two ends 211, 212 is provided (see FIG. 9). The two ends 211, 212 are configured to respectively mate with the first and second seats 11, 12 so as to permit the elongated foam member 21 to be fittingly disposed between the first and second seats 11, 12 in the elongated space 130.

In (a3), the elongated foam member 21 is disposed in the elongated space 130 to permit the two ends 211, 212 of the elongated foam member 21 to respectively mate with the first and second seats 11, 12.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for making a bicycle crank arm of a bicycle, comprising:
   (a) providing an inner frame unit which defines a longitudinal axis, and which has
      a first seat,
      a second seat which is spaced apart from the first seat in a direction of the longitudinal axis, the first and second seats defining therebetween an elongated space,
      at least one first direction reversing guide formed in or in proximity to the first seat, and
      at least one second direction reversing guide formed in or in proximity to the second seat;
   (b) winding a first bundle of unidirectional continuous fibers over the elongated space through the first and second direction reversing guides such that the first bundle has a plurality of first segments each extending straightly between the first and second direction reversing guides, and a plurality of second segments each extending about the longitudinal axis, to thereby form an intersecting pattern on the inner frame unit;
   (c) impregnating the intersecting pattern with a curable resin material to obtain an impregnated structure; and
   (d) molding the impregnated structure in a mold to cure the curable resin material to thereby obtain a fiber-reinforced semi-product, which has the inner frame unit therein, for the bicycle crank arm.

2. The method according to claim 1, wherein:
the inner frame unit further has a pair of bridging ribs each interconnecting the first and second seats at first and second junctures, the bridging ribs being spaced apart from each other in a transverse direction relative to the longitudinal direction such that the elongated space is further by the bridging ribs;
the first direction reversing guide is formed in or in proximity to one of the first junctures of the first seat; and
the second direction reversing guide is formed in or in proximity to one of the second junctures of the second seat.

3. The method according to claim 1, wherein each of the first and second direction reversing guides is in the form of a guide hole so as to permit the first bundle to pass through the guide holes of the first and second direction reversing guides to thereby form the first segments of the first bundle in step b).

4. The method according to claim 2, before (b), further comprising:
(a1) fittingly inserting a foam member into the elongated space.

5. The method according to claim 1, before (c), further comprising:
(b1) covering the inner frame unit with a first fiber braided sleeve so as to permit the first fiber braided sleeve to overlie the intersecting pattern and so as to permit the first fiber braided sleeve, together with the intersecting pattern, to be impregnated with the curable resin material in (c).

6. The method according to claim 5, before (c), further comprising:
(b2) helically winding a second bundle of unidirectional continuous fibers on the first fiber braided sleeve about the longitudinal axis to form a helical pattern; and
(b3) overlying the helical pattern with a second fiber braided sleeve so as to permit the second fiber braided sleeve and the helical pattern, together with the intersecting pattern and the first fiber braided sleeve, to be impregnated with the curable resin material in (c).

7. The method according to claim 6, wherein the unidirectional continuous fibers of the first and second bundles are carbon fibers, and the first and second fiber braided sleeves are made of carbon fibers.

8. The method according to claim 1, wherein the first direction reversing guide is formed in the first seat, and the second direction reversing guide is formed in the second seat,
the method, before (b), further comprising:
(a2) providing an elongated foam member with two ends which are configured to respectively mate with the first and second seats so as to permit the elongated foam member to be fittingly disposed between the first and second seats in the elongated space; and
(a3) disposing the elongated foam member in the elongated space to permit the two ends of the elongated foam member to respectively mate with the first and second seats.

* * * * *